Oct. 28, 1930.  J. W. MATTHEWS  1,779,743
WINDMILL
Filed July 20, 1927  4 Sheets-Sheet 1

Inventor
James W. Matthews
By *Clarence A. O'Brien*
Attorney

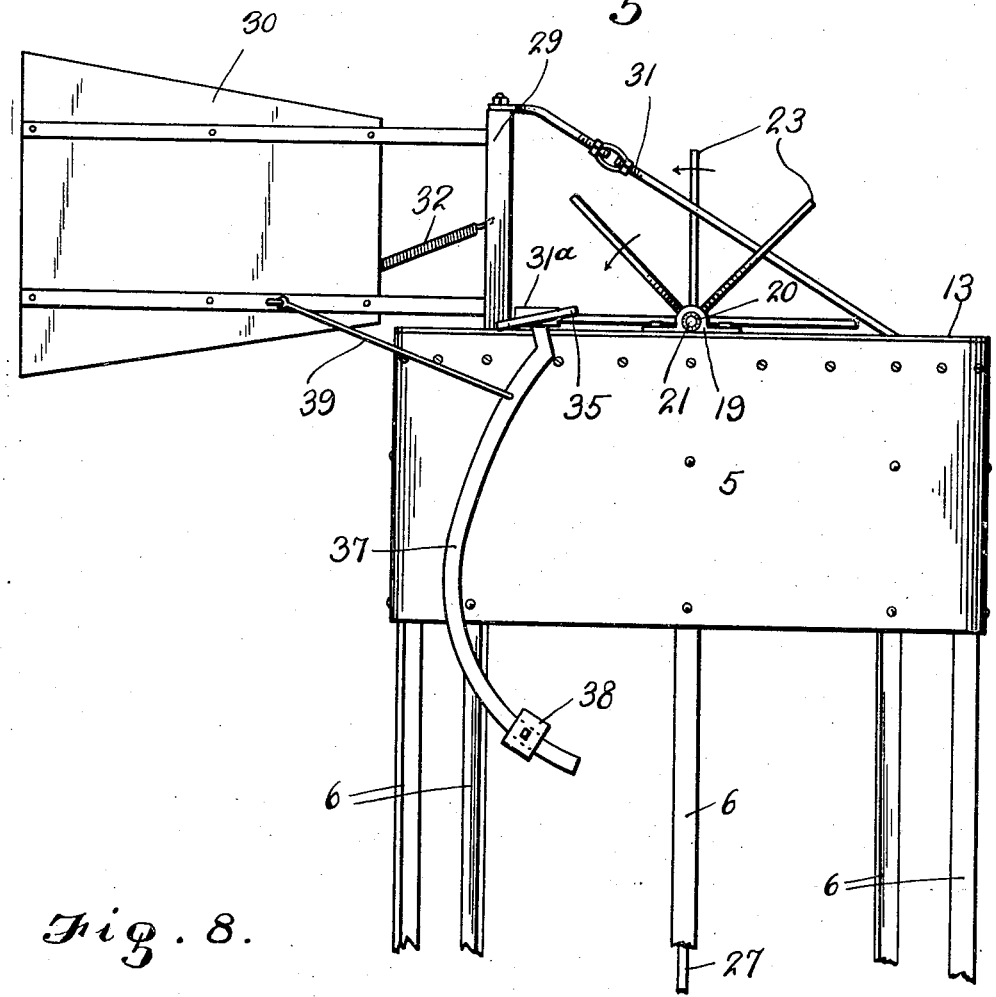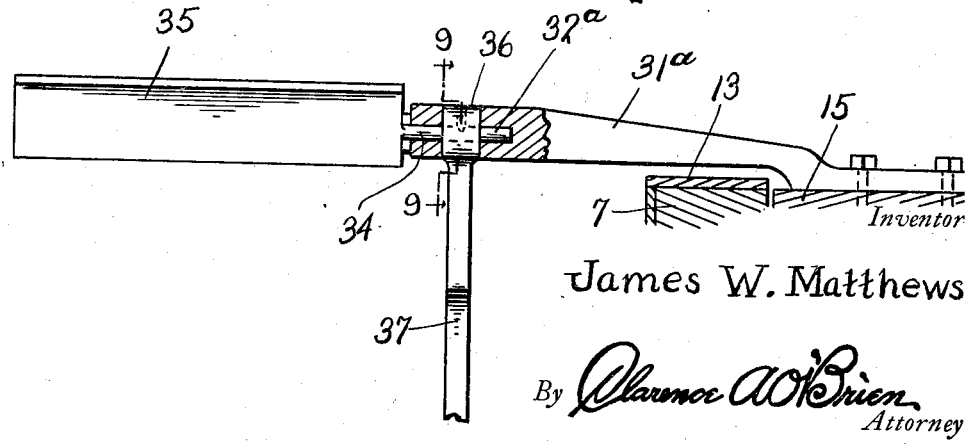

Oct. 28, 1930.  J. W. MATTHEWS  1,779,743
WINDMILL
Filed July 20, 1927  4 Sheets-Sheet 3
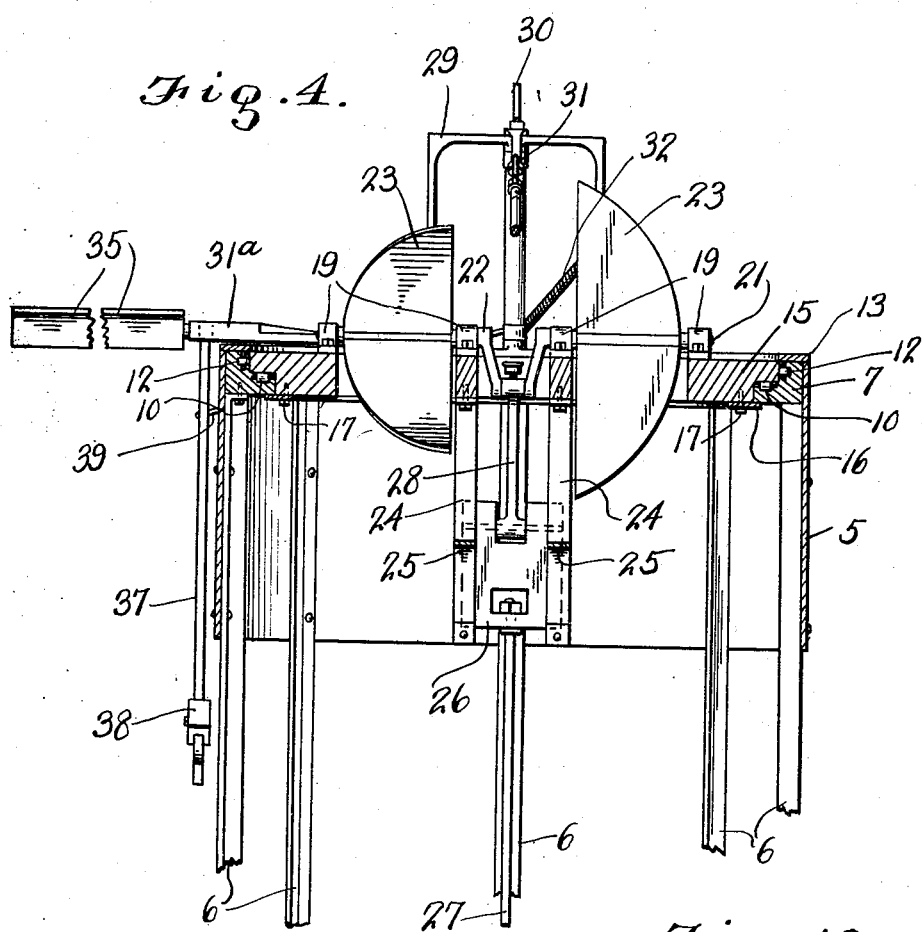
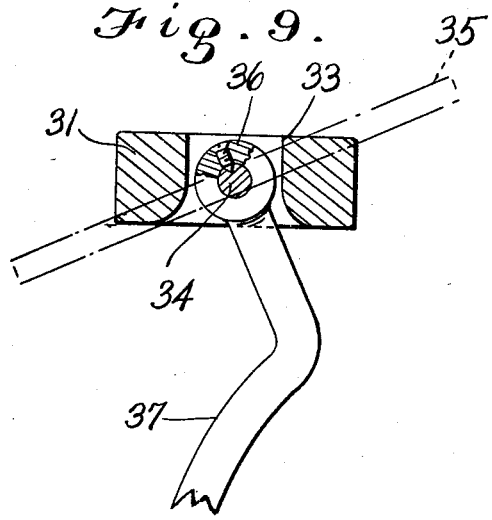
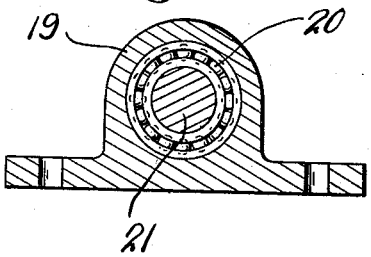
Inventor
James W. Matthews
By *Clarence A. O'Brien*
   Attorney

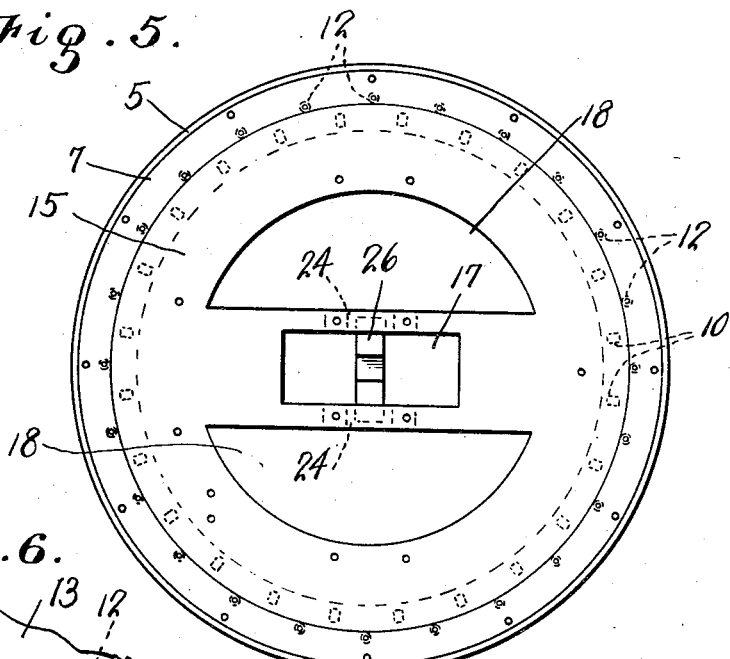
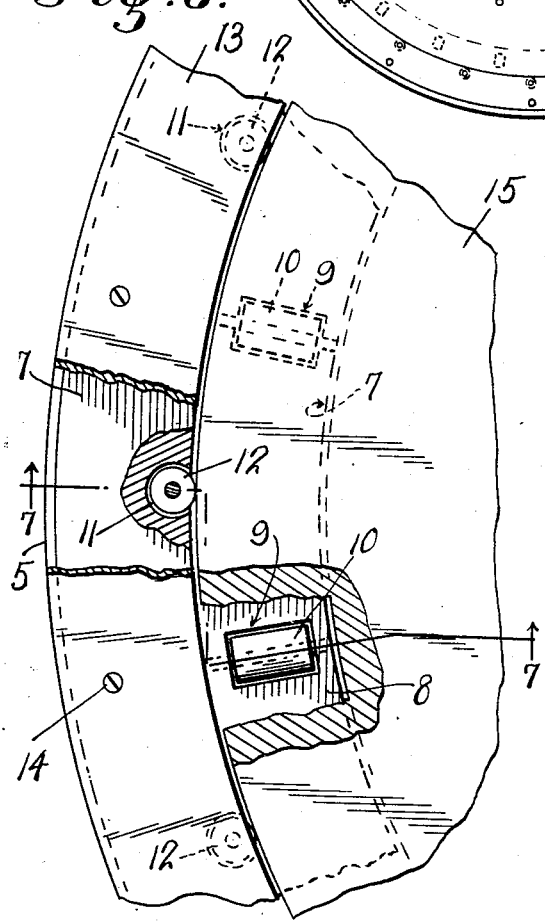
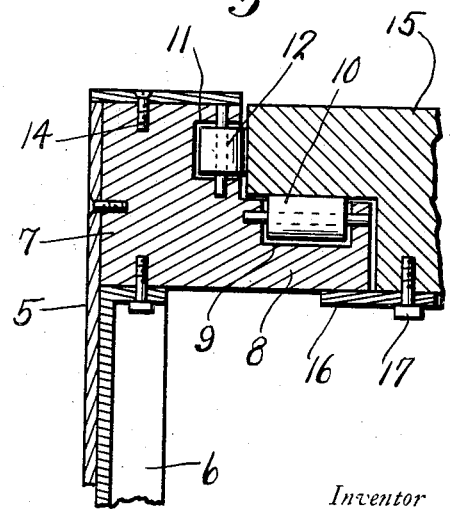
Inventor
James W. Matthews
By Clarence A. O'Brien
Attorney Patented Oct. 28, 1930

1,779,743

UNITED STATES PATENT OFFICE

JAMES WILLIAM MATTHEWS, OF HARLINGEN, TEXAS

WINDMILL

Application filed July 20, 1927. Serial No. 207,174.

This invention relates to new and useful improvements in windmill constructions and aims to provide a highly novel, simple and efficiently operating device for use in the operation of well pumps, machinery and the like.

In carrying out my invention there is provided a windmill that generally includes a horizontal shaft upon which is mounted fan blades adapted to be rapidly rotated by the force of the wind passing thereagainst, said shaft having a crank portion which is operatively associated with a power rod whereby power may be derived from the rotation of the shaft.

Furthermore, means is provided for maintaining the blade in direct face of the wind so that the device will operate efficiently regardless of the direction of the wind.

Furthermore, means is provided whereby the blades are moved out of the direct path of the wind in the event of a hurricane, cyclone or the like so that the device will not operate so rapidly as to vibrate excessively which is one of the great disadvantages with windmills now in use.

With the foregoing and other objects in view as the nature of the invention will be better understood, the same comprises the novel form, combination and arrangement of parts hereinafter more fully described, shown in the accompanying drawings and claimed.

In the accompanying drawings forming part of this application and in which like numerals indicate corresponding parts:

Figure 3 is a side elevation.

Figure 4 is a section taken at right angles to that disclosed in Figure 3.

Figure 5 is a top plan view of the windmill casing, the wind controlling mechanism being removed therefrom.

Figure 6 is an enlarged fragmentary elevation partially in cross section for more clearly disclosing the means whereby the wind controlling mechanism is supported for rotation within the casing of the windmill.

Figure 7 is a detail fragmentary horizontal section taken substantially upon the broken line 7—7 of Figure 6.

Figure 8 is a fragmentary view partially in section and partially in elevation of the wind control means whereby the fan blades are moved out of the direct path of the wind in the event of a cyclone or tornado.

Figure 9 is a transverse section on an enlarged scale taken substantially upon the line 9—9 of Figure 8, and Figure 10 is a sectional view through one of the shaft supporting trunnions of the mechanism.

Figure 1:
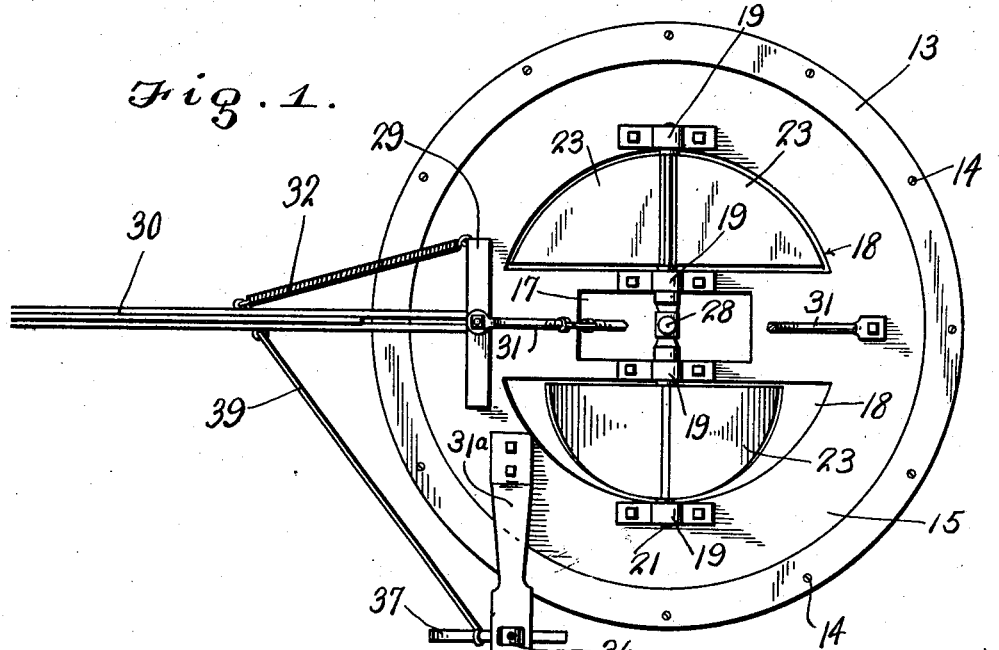
Figure 1 is a top plan view of my improved windmill construction.
Figure 2:
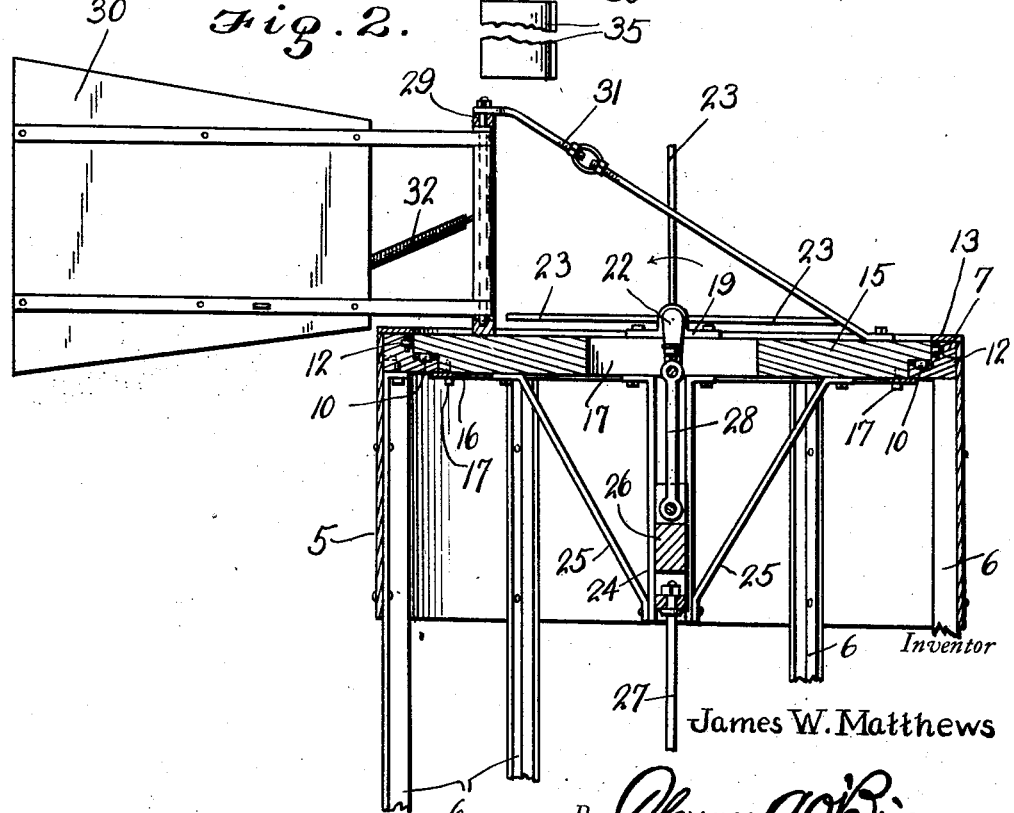
Figure 2 is a detail vertical section thereof.

Now having particular reference to the drawings, my novel windmill construction consists of a cylindrical sheet metal casing 5 open at its opposite ends as clearly indicated in Figures 2 and 4. Rigidly secured within this casing and terminating beneath the upper edge thereof are a predetermined number of depending frame structure supporting legs 6, preferably of angle iron as also disclosed in said Figures 2 and 4.

Arranged within the upper end of the casing 5 and resting upon the upper ends of the legs 6 and preferably secured thereto and to the casing by suitable set screws or bolts is a supporting annulus 7 formed at its lower edge with an inwardly directed circumferential flange 8 that is formed at predetermined spaced points throughout its circumference and at its top surface with sockets 9 within which are arranged bearing rollers 10. Directly above this flange 8 the side wall of the annulus 7 is formed with small sockets 11 for receiving vertically arranged bearing rollers 12. Arranged over the annulus 7 and over the upper edge of the casing 5 is a retaining ring 13 preferably secured to the annulus by screws 14. Arranged within the annulus 7 and resting upon the flange 8 is a circular plate 15 of increased thickness within the edge thereof so that the center will engage within the annulus flange 8 as clearly disclosed in Figures 2 and 7, the bottom surface of this plate resting upon the rollers 10, while the edge thereof engages the vertical rollers 12 so that the same may freely rotate within the annulus and upon said flange. Arranged around the edge of the bottom wall at the plate 15 and extending beneath the edge of the flange 8 is a ring 16 secured to the plate by screws 17 which prevent the raising of the plate from the annulus.

This plate 15 is formed centrally with a rectangular shaped opening 17, while at opposite sides of the opening 17 are substantially semi-circular openings 18—18. Arranged upon opposite sides of the opening 17 and the outer edges of the semi-circular openings 18—18 are shaft trunnions 19 within which are arranged conventional ball bearings 20, while journaled through these bearings and trunnions is a shaft 21 formed centrally with a crank portion 22 movable through the rectangular opening 17 in said plate 15. At the points of the shaft mounting the openings 18—18 said shaft is equipped with segmental blades 23, the blades at one opening 18 being arranged in staggered relation to those adjacent the opposite opening as clearly indicated in Figures 3 and 4.

Depending from the plate 15 at opposite sides of the central opening 18 are cross head guides 24—24 suitably braced at their lower ends to the under side of the plate 15 by brace rods 25. Vertically slidable between these guides 24—24 is a block-like cross head 26 to the lower end of which is suitably swivelly connected the upper end of a power rod 27 that extends downwardly and that is operatively connected at its lower end to a pump or other machinery to be driven. The upper end of this cross head 26 is operatively connected to the crank portion 22 of the shaft 21 by a suitable connecting rod 28 with the obvious result that when the shaft 21 is rotated by the action of the wind encountering the blades 23 the cross head 26 will reciprocate within the guides 24—24 to cause the rectilinear movement of the power rod 27.

Secured to the plate 15 directly in back of adjacent ends of the substantially semi-circular openings 18—18 in said plate is a vertically extending frame unit 29 within which is pivoted for horizontal swinging movement a wind controlled vane 30 of generally conventional construction. The said frame structure 29 is braced to an opposed point of the plate 15 by reason of the strut rod 31 which extends diagonally downwardly between the blades 23 at opposite sides of the center rectangular opening 17 of said plate 15. Connected at one end to the side of the blade 30 and at its opposite end to one side of the frame structure 29 is a strong retractile coil spring 32 that normally tends to maintain the vane 30 at direct right angles to the shaft 21.

Secured at its inner end to the upper surface of the rotating plate 15 adjacent the vane supporting structure 29 and in parallel relation to the shaft 21 is an arm 31ª the outer end of which extends above and beyond the casing 5. The outer end of this arm 31ª is formed with a longitudinally extending pin receiving socket 32, while intermediate the ends of said socket said arm 31ª is formed with a circular cut out 33, the lower edge of which is outwardly flared as clearly disclosed in Figure 9. Arranged within the socket 32ª of the arm 31ª is a pin 34 carried by the inner end of a relatively elongated horizontal weather vane 35, while keyed to the pin 32 and movable within the opening 33 of the arm is the inner collared end 36 of a depending and arcuate shaped counter balancing arm 37 upon which is adjustably slidably arranged a weight 38. Adjacent the upper end of this arm 37 the same is connected to the adjacent side of the vane 30 by reason of a flexible cable 39. When the vane 30 is at direct angles to the shaft 21 the spring 32 is in fully retracted position, while the cable 39 is in taut condition while the transverse axis of the vane 35 is at an angle to a horizontal plane. Obviously, under the normal wind pressure the same will so act upon the vane 30 as to maintain the blade carrying plate 15 in such a position that the blade 23 will be in direct path of the wind, the vane 30 turning with the wind for consequently turning the plate 15 and its associated structure. However, in the event of a heavy wind the same will so act upon the vane 35 as to cause the same to turn transversely which will raise the arm 37 against the action of the weight 38 leasing the tension of the cable 39 thereby permitting the spring 32 to swing the vane 30 out of direct right angles with the shaft 21 which will cause the turning of the plate 15 and its associated structure so that the blades 23 will be out of the direct path of the wind, thereby preventing the power shaft 21 from rotating at an excessive speed.

In view of the foregoing description when considered in conjunction with the accompanying drawings it will at once be apparent that I have provided a highly novel, simple and extremely windmill construction that is well adapted for all the purposes heretofore designated, and even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a windmill construction of the character described, a cylindrical casing, a support for the casing, the ends of the casing being open, a plate rotatably supported within the open upper end of the casing, said plate being formed with an opening, a shaft horizontally disposed and journaled upon said plate, vane blades carried by said shaft, said blades being adapted to pass through said opening and within said casing in rotating to a position adverse to the wind direction, and means for preventing the lifting of the plate from the casing.

2. In a wind mill construction of the character described, a cylindrical casing, a support for the casing, the ends of the casing being open, a plate rotatably supported within the open upper end of the casing, said plates being formed with openings, a shaft journaled on said plate and over said openings, sets of wind responsive devices on said shaft, said sets of devices each consisting of a plurality of vanes radiating from the shaft, said vanes being adapted to pass through said openings and through said casing in rotating to a position adverse to the wind direction, the vanes of each set being disposed in angular planer relation to each other, and means associated with said rotatable plate for shifting the wind responsive devices to a neutral position in respect to the wind direction.

3. In a windmill construction of the character described including a cylindrical casing and a support for the casing having its ends open; a plate rotatably supported within the open upper end of the casing for supporting the usual rotary element of the windmill, and means for preventing the lifting of the plate from the casing, said means comprising a circumferentially extending flange secured to the casing within the upper portion thereof and upon which the plate is rotatably supported, and an annulus secured to the bottom side of the plate so as to project beyond the perimeter of the plate and beneath the said flange.

In testimony whereof I affix my signature.

JAMES WILLIAM MATTHEWS.